(No Model.)
C. PAYEN.
MOLD FOR CASTING PLATES FOR USE AS ELECTRODES OF STORAGE BATTERIES.
No. 415,332. Patented Nov. 19, 1889.
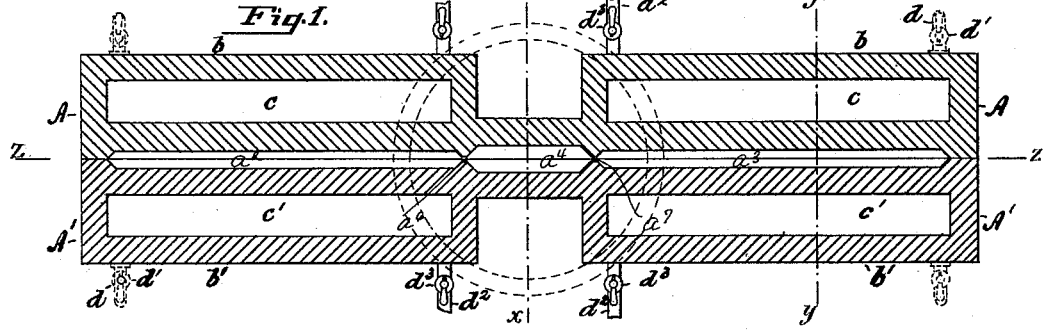
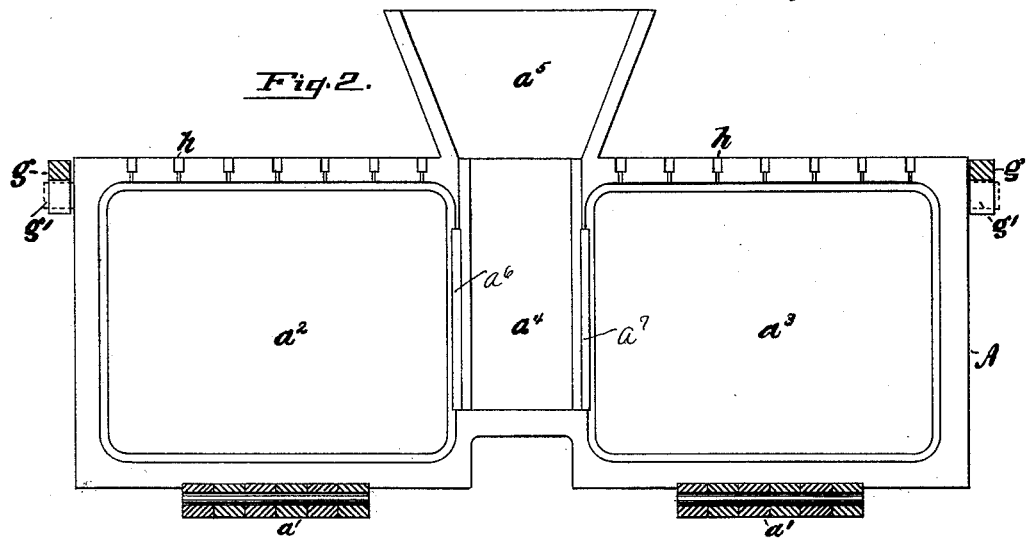
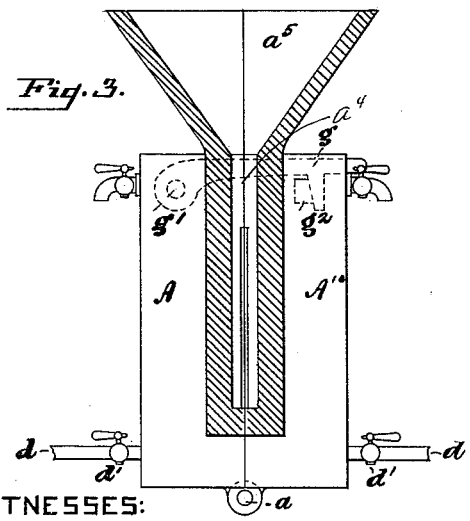
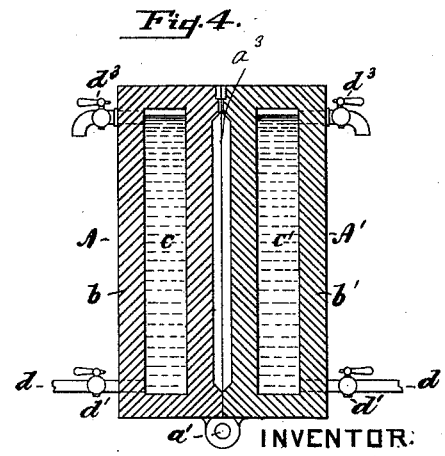
WITNESSES:
Hermann Bornmann.
Thomas M. Smith.
INVENTOR:
Clement Payen,
By J. Walter Douglas
ATT'Y.

UNITED STATES PATENT OFFICE.

CLÉMENT PAYEN, OF PHILADELPHIA, PENNSYLVANIA, ASSIGNOR TO THE ELECTRIC STORAGE BATTERY COMPANY, OF GLOUCESTER CITY, NEW JERSEY.

MOLD FOR CASTING PLATES FOR USE AS ELECTRODES OF STORAGE-BATTERIES.

SPECIFICATION forming part of Letters Patent No. 415,332, dated November 19, 1889.

Application filed August 15, 1888. Serial No. 282,807. (No model.)

*To all whom it may concern:*

Be it known that I, CLÉMENT PAYEN, a citizen of the Republic of France, but now residing at the city of Philadelphia, in the county of Philadelphia and State of Pennsylvania, have invented certain new and useful Improvements in Molds for Casting Plates for Use as Electrodes of Storage-Batteries, of which the following is a specification.

My invention relates to metal molds for casting plates or other structures to form electrodes of storage-batteries.

The principal object of my invention is to provide a metal mold wherein a previously-fused mass in cooling may become crystallized—that is, with the atomic aggregation or crystals composing the mass forming in the plate or structure in columns.

The nature and characteristic features of my invention will be more particularly understood by reference to the accompanying drawings, forming part hereof, and in which—

Figure 1 is a longitudinal central section through my improved mold. Fig. 2 is a vertical central section on the line $z\,z$ of Fig. 1 of one part of the mold, showing the central funnel-shaped neck thereof, into which the material is introduced into the mold. Fig. 3 is a cross-sectional view on the line $x\,x$ of Fig. 1, and Fig. 4 is a similar view on the line $y\,y$ of Fig. 1.

Referring to the drawings, A and A' represent the two-part mold, made of brass, bronze, or other suitable metal. This mold may be constructed rectangular in shape or form, if desired, with the parts A and A' hinged together at $a$ and $a'$, Fig. 2. Formed integral with each part and between the matrices $a^2$ and $a^3$ of the mold is a central channel or chamber $a^4$, with a funnel-shaped mouth $a^5$, into which the material is poured and passes downward through the channel or chamber $a^4$ and from thence into the matrices $a^2$ and $a^3$ on each side thereof. The two parts A and A' of the mold may be constructed either of equal or unequal thicknesses of metal, as may be desired. Between the outer walls $b$ and $b'$ and the matrices $a^2$ and $a^3$ of the mold are provided jackets $c$ and $c'$, and into which water is admitted through pipes $d$, provided with stop-cocks $d'$ and with overflow-pipes $d^2$, provided with spigots or cocks $d^3$. The water is admitted between the outer and inner walls of the mold for the purpose of allowing the fused mass poured into the mold through the funnel-shaped mouth $a^5$ and passing downward through the channel or chamber $a^4$ into the matrices $a^2$ and $a^3$ to become crystallized by a rapid cooling and thereby cast into plates or structures having the atomic aggregation of the mass composing the plates or structures formed with geometrical regularity in columns, or columns substantially parallel to each other. The formation of the crystals of the plates or structures commences to take place from the sides of the matrices in the direction of the median line thereof.

In the extended use of molds embodying my invention I have found that when a fused mass is poured into a two-part mold of equal thicknesses of metal the mass will commence to cool from each side and the crystals composing the same will meet or unite with each other at their summits, sides, or facets, forming columns uniformly throughout the mass, and the columns of crystals thus formed from the respective sides of the mold meet or unite at the median line of the plate or other structure. On the other hand, if the parts of the mold are of unequal thicknesses of metal the crystals of the mass will commence to cool therein from the side having the greater thickness of metal and will meet the mass forming in columns from the opposite side of the mold beyond the median line of the plate or other structure.

Plates formed in molds having the sides of equal thickness of metal when reduced to a metallic state by a suitable treatment I have found possess in a maximum degree strength, and are especially adapted for use as the plates or elements of secondary or storage batteries. The two parts A and A' of the mold hinged together at $a$ and $a'$ are securely held together for use by means of latch-bars $g$, pivoted at $g'$ to the ends of the part A of the mold, and which latch-bars $g$ engage with projections $g^2$, formed with or secured into the ends of the part A′ of the mold. The matrices $a^2$ and $a^3$ of the mold have beveled edges in order that the plates formed therein may have beveled-off edges, so that narrow frames may be formed around them in a suitable mold with lugs to which wires connected with a dynamo may be attached for storing up electrical energy after the plates have been cast, reduced to a metallic state, and mounted in battery. The edges of the matrices $a^2$ and $a^3$, in juxtaposition or contiguous to the channel $a^4$, are cut away, as indicated by the letters $a^6$ and $a^7$, for allowing the material charged into the funnel-shaped mouth $a^5$ and passing downward through the channel or chamber $a^4$ to be readily admitted to the respective matrices $a^2$ and $a^3$ on opposite sides of the said chamber or channel $a^4$ and to form a line or division between the fused mass contained in the channel $a^4$ and the plates formed in the matrices, whereby upon releasing the latch-bars $g$ in engagement with the projections $g^2$ of the part A′ of the mold the plates formed in said matrices may be readily removed. In the surface of each part of the mold, at suitable distances apart and extending from the edges of the matrices $a^2$ and $a^3$, are provided vertical slits or recesses $h$, which increase in diameter from a point midway from the edge of the matrices to the top surface of the mold, and these recesses $h$, forming vent-holes, are provided for conducting off any fumes or gases from the mass solidifying in the matrices into the open air, and thereby insuring excellent results in the use of molds of the type hereinbefore fully described for the production of plates especially adapted to form the elements of secondary or storage batteries.

Having thus described the nature and objects of my invention, what I claim as new, and desire to secure by Letters Patent, is—

The herein-described metal mold, consisting of two parts hinged together and each provided with a central projection $a^5$, forming, when said parts are in contact with each other, a trough which communicates with a vertical chamber $a^4$, having slits $a^6$ and $a^7$ in the surface to permit the mass to flow therefrom into matrices $a^2$ and $a^3$, having beveled edges or sides with vents $h$ therein, and means, as described, for clamping said parts together, all arranged as shown, and for the purposes set forth.

In witness whereof I have hereunto set my signature in the presence of two subscribing witnesses.

CLÉMENT PAYEN.

Witnesses:
 FRANK C. LEWIN,
 GEO. W. REED.